United States Patent
Saund et al.

(10) Patent No.: US 6,457,792 B1
(45) Date of Patent: Oct. 1, 2002

(54) METHOD FOR EFFECTING ACTIONS OVER VERTICAL SURFACES

(75) Inventors: Eric Saund, San Carlos, CA (US); Kenneth P. Fishkin, Redwood City, CA (US); Thomas P. Moran, Palo Alto, CA (US); Daniel L. Larner, San Jose, CA (US); Thomas M. Breuel, Brisbane, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,467

(22) Filed: Nov. 29, 1999

(51) Int. Cl.[7] .............................................. G01D 15/16
(52) U.S. Cl. ....................... 346/139 R; 33/1 M; 33/18.1
(58) Field of Search ......................... 346/139 B, 139 R; 347/2, 19, 104, 110; 33/1 M, 18.1, 26, 32.1, 32.3, 35

(56) References Cited

U.S. PATENT DOCUMENTS

| | | | | |
|---|---|---|---|---|
| 3,665,608 A | * | 5/1972 | Stockebrand | ................. 33/1 M |
| 4,412,383 A | * | 11/1983 | Landa | .......................... 33/1 M |
| 4,583,292 A | * | 4/1986 | Langberg | ................. 346/139 B |
| 4,600,083 A | * | 7/1986 | Parent et al. | ........... 346/139 B |
| 4,754,288 A | * | 6/1988 | Lawrence | ................. 346/139 R |
| 4,843,406 A | * | 6/1989 | Murray et al. | .......... 346/139 R |
| 4,849,771 A | * | 7/1989 | Lawrence et al. | ....... 346/139 R |
| 5,063,334 A | * | 11/1991 | Tanita et al. | ............. 318/568.1 |
| 5,072,410 A | * | 12/1991 | Vachris et al. | .......... 346/139 R |
| 5,649,828 A | * | 7/1997 | Kawashima | ................. 434/411 |
| 6,116,707 A | * | 9/2000 | Avida | ..................... 346/139 R |

FOREIGN PATENT DOCUMENTS

EP          0 074 190 A2 *   3/1983   ............ G01D/9/40

* cited by examiner

*Primary Examiner*—John Barlow
*Assistant Examiner*—Julian D. Huffman

(57) ABSTRACT

The Pendulum Whiteboard Printer is a fully-automatic robotic device for marking or otherwise effecting whiteboards, pinboards, or other vertical surfaces. The physical device consists of an effector platform suspended by two suspension wires whose lengths are adjusted by motorized spindles mounted above and on either side of the board surface. The position of the effector platform is adjusted by winding and unwinding the wires. Methods are provided for using the Pendulum Whiteboard Printer to perform various actions and for moving the effector platform to a desired location.

5 Claims, 5 Drawing Sheets

METHOD FOR EFFECTING ACTIONS OVER VERTICAL SURFACES

FIELD OF THE INVENTION

The present invention relates generally to performing mechanical actions such as drawing or printing, and more particularly to a system for performing the mechanical actions such as drawing on and erasing whiteboards and other substantially vertical surfaces.

BACKGROUND OF THE INVENTION

A great deal of work has been devoted to integrating large drawing and display surfaces with electronic document faculties. Technology has been developed to support two directions of information flow, image capture, and image display.

Image capture technologies enable marks drawn on a surface to be captured in electronic form. These include the pressure-sensitive tablets such as the SMART Board from SMART Technologies, Inc. of Calgary, Alberta, Canada, location-sensitive surfaces accompanied by special pens such as the Liveboard from Xerox Corporation of Stamford, Conn., and Mimeo from Virtual Ink Corporation of Boston, Mass., Laser-based pen trackers such as the SoftBoard from Microfield Graphics, Inc. of Portland, Oreg., camera-based scanning such as the ZombieBoard from Xerox Corporation, and 1-dimensional scan bars such as the Copyboard from Xerox Corporation. The ZombieBoard is further described in U.S. Pat. No. 5,528,290 to Saund, entitled DEVICE FOR TRANSCRIBING IMAGES ON A BOARD USING A CAMERA BASED BOARD SCANNER.

Image display technologies permit stored electronic images to be displayed on a large surface. These include plasma, active matrix, liquid crystal, light-emitting diode, and projectors which can be either front-projection or rear-projection. Of the various image display technologies, only the projectors are compatible with an inexpensive, passive, surface of variable and extensible size. All of the others require dedicated display hardware which is expensive and fixed in size.

In addition to the applications for generating images on large vertical surfaces, a variety of other applications exist such as window washing, moving physical tokens, and the like.

SUMMARY OF THE INVENTION

The present invention is a method for performing mechanical actions such as drawing on substantially vertical surfaces such as whiteboards. For convenience, the present inventive environment is referred to as a Pendulum Whiteboard Printer. The term "pendulum" is chosen because the carriage for holding the effector that performs the mechanical action, called an effector platform, is suspended against the force of gravity by suspension wires. It is not a true pendulum in the x-y plane because two wires are used. While the present invention is referred to as a printer, no printing in the traditional meaning of the word is done. Rather, all marks are drawn by moving a marking element across the surface with an effector platform.

The present invention utilizes an inexpensive mechanism for remotely generating images on whiteboards and other substantially vertical surfaces. The term "image" as used in this specification refers to any marking created by a marking element such as a dry-erase pen. The markings may be in the form of textual characters, straight or curved strokes, or any other types of marks that could be hand-drawn.

An effector platform is provided for holding an end effector such as the marking element. The effector platform is suspended by two wires from two spools placed near the upper, outer, boundaries of the surface to be marked on. The lengths of the two wires are adjusted to control the location of the effector platform over the surface to be marked on. These wires are typically wound on motorized spools permitting their lengths to be varied under computer control. The spools may be located above and beyond the ends of the target surface so that all parts of the surface are reachable. If needed, control signals to the effector platform can be provided through the wires using techniques well-known in the art. Power may be supplied to the effector platform through the wires or from an on-board battery.

In an alternative embodiment of the invention, where a portable Pendulum Whiteboard Printer is placed in an appropriate location relative to the whiteboard, a calibration routine may be run so that the system knows the drawing area of and locations on the whiteboard. However, even with a fixed embodiment of the whiteboard printer, occasional calibrations may be desirable. Such calibrations may be performed using any techniques known in the art. For example, one such calibration technique would be to move the effector platform to a known board location using feedback information such as video camera and resetting the coordinates describing the effector platform position.

DETAILED DESCRIPTION OF THE INVENTION

Figure 1:
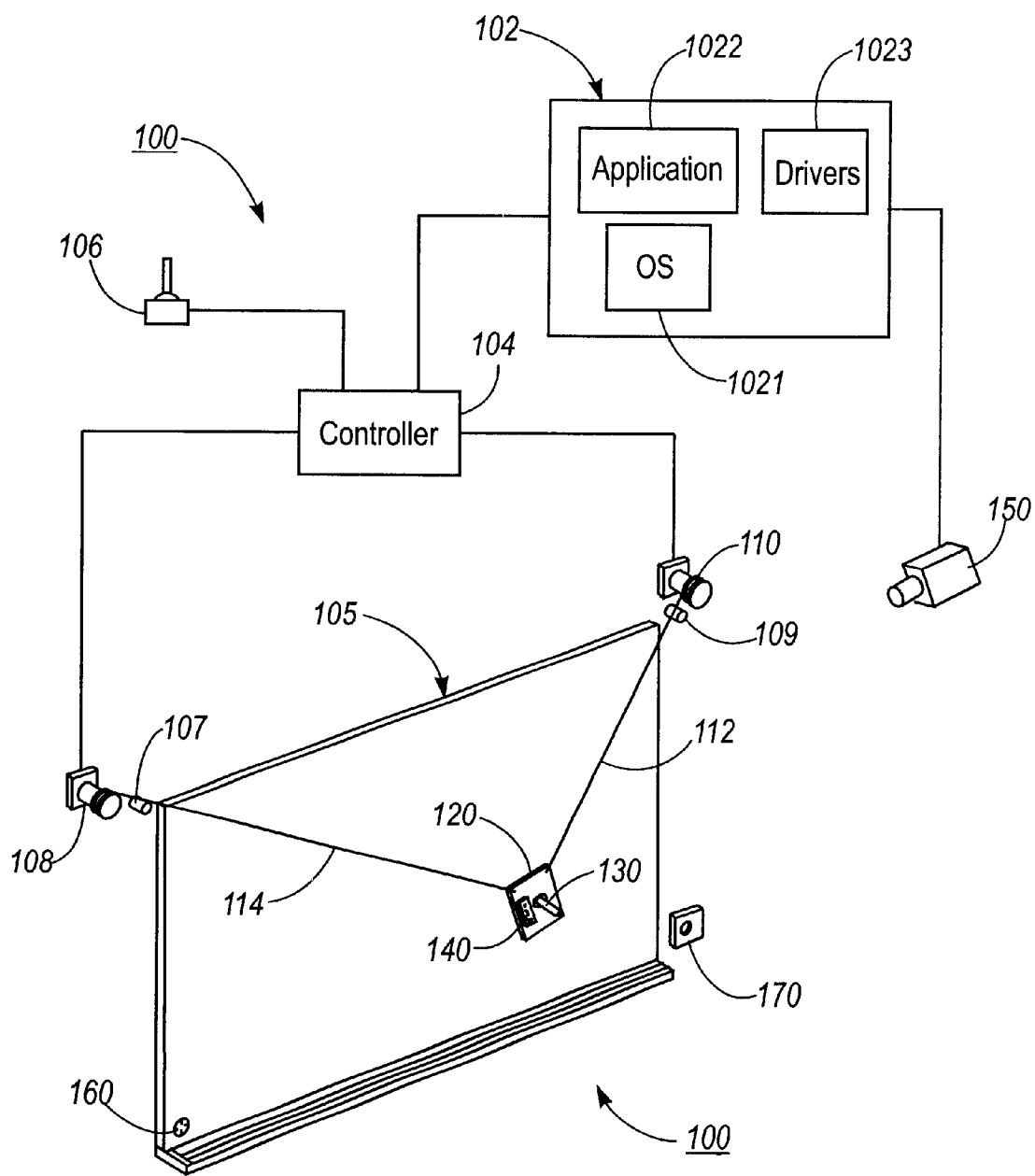
FIG. 1 is a block/perspective view diagram of a Pendulum Whiteboard Printer system according to the present invention.

FIG. 1 depicts the Pendulum Whiteboard Printer 100 which forms the environment of the present invention in perspective view, including some functional block elements. The Pendulum Whiteboard Printer system is discussed in greater detail in concurrently filed, co-assigned, U.S. patent application Ser. No. 09/450,468 entitled SYSTEM FOR EFFECTING ACTIONS OVER VERTICAL SURFACES, which is hereby incorporated by reference into the present specification.

An end effector 130 such as marking pen or the like is used for creating images on a whiteboard 105. Those skilled in the art will readily appreciate that a dry-erase marker will typically be used for whiteboards. Those skilled in the art will further appreciate that the present invention is not limited to marking on whiteboards, but may be used with any substantially-vertical surface, and that the action performed by the whiteboard printer is not limited to simply making marks, but may also be used for performing other actions, as will be discussed in greater detail below. For ease of discussion, the vertical surface will be referred to herein as a whiteboard. The marking element, or end effector 130 is held in place and moved with an effector platform 120, which is suspended from a left wire 114 and a right wire 112. The left wire 114 is connected to a left spool 108, and the right wire 112 is connected to a right spool 110. The left and right spools are motorized to control the reeling in and unreeling of wire from the spool. Those skilled in the art will recognize that for such reasons as better control, faster acceleration, more accurate fast positioning, greater tension to control jiggle and bounce, greater tension to produce z-force, control while moving, among others, more than two wires may be used without departing from the spirit and scope of the present invention.

When the whiteboard printer 100 is not in use, the effector platform can be returned to a parking facility 170 for storing end effectors, among other reasons. The effector platform and parking facility are discussed in greater detail in concurrently filed, co-assigned, patent applications, U.S. Pat. No. 6,367,902 entitled EFFECTOR PLATFORM FOR PERFORMING ACTIONS OVER VERTICAL SURFACES and U.S. Pat. No. 6,368,002 entitled PARKING MECHANISM FOR END EFFECTORS USED FOR PERFORMING ACTIONS OVER VERTICAL SURFACES, respectively, both of which are hereby incorporated by reference into the present specification.

The whiteboard printer 100 will typically be controlled by a computer 102, through a controller 104, which may be implemented in hardware or software, and may be a separate unit or part of the computer 102. Alternatively, the whiteboard printer 100 may be controlled using a joystick 106 that is coupled through controller 104. The computer 102 operates under the control of Operating System (OS) 1021 and may be any general-purpose computer known in the art. The computer 102 communicates with the whiteboard printer 100 through the controller 104 by way of an interface 103, which may be any commonly-used computer communication interface such as a parallel or a serial interface. If closed-loop positioning is utilized, a camera 150 may be used to provide feedback information to the computer 102, as depicted, or directly to the controller 104. The calculations described below for positioning the effector platform 120 may be performed by the computer 102 and/or the controller 104 and may be implemented in software and/or hardware. The method of the present invention will preferably be implemented in software as computer-executable instructions, but may also be implemented in various embodiments of hardware. Driver programs 1023 for application programs 1022 for such applications as word processing, spreadsheets, and presentation graphics, among others, may be provided to generate their respective outputs on large vertical surfaces.

Since the effector platform 120 is suspended from the two wires 114 and 112, the effector platform 120 may be moved to any position beneath and between the left spool 108 and right spool 110 by adjusting the lengths of the left and right wires 114 and 112, respectively. In order to be able to mark on any part of the whiteboard 105, the left and right spools 108 and 110, respectively, are preferably placed above the top edge of the whiteboard and beyond the left and right edges of the whiteboard, respectively, as shown in FIG. 1. The positioning of the effector platform 120 will be discussed in greater detail below. The left spool 108 and right spool 110 are used to wind and unwind the respective connected left suspension wire 114 and right suspension wire 112 to thereby lengthen and shorten the suspension wire between the respective spool and the effector platform. This is referred to as open loop positioning of the effector platform.

Open Loop Positioning

Figure 2:
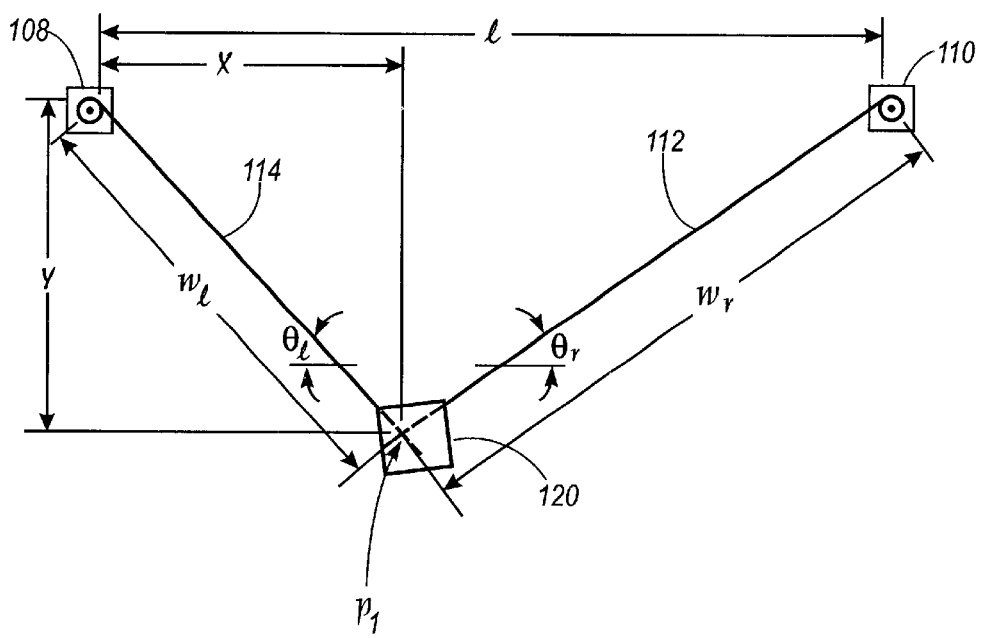
FIG. 2 is an elevation view diagram of a Pendulum Whiteboard Printer according to the present invention.

Referring to FIG. 2, the lengths of the wires are adjusted by turning the spools to wind or unwind measured lengths of wire. Since the circumference of the spools is known, it is a simple matter to determine the number turns required to reel in or out a particular length of wire.

A point $p_1$ on effector platform 120 denotes a projected intersection of the left wire 114 and right wire 112 at a given (x,y) location over the whiteboard 105. To calculate the amount to turn each spool to position the effector platform at a desired (x,y) location on the surface, we first calculate the length of the left wire 114, $w_l$, and the length of the right wire 112, $w_r$, required to position the projected wire intersection point $P_1$ at this location, as shown in FIG. 2:

$$w_l = \sqrt{x^2 + y^2} \tag{1}$$

$$w_r = \sqrt{(l-X)^2 + y^2} \tag{2}$$

where l is the horizontal distance between the support motors. For the purposes of the present calculations, the two spools are assumed to be at the same height. Those skilled in the art will readily appreciate that the spools need not be at the same height, but may be placed at any height relative to one another, and that the calculations would be altered to account for the vertical offset.

The (x, y) position establishes the angles $\theta_l$ and $\theta_r$ which remain approximately unchanged for small changes in platform positioning:

$$\theta_l = \arctan\frac{y}{x} \tag{3}$$

$$\theta_r = \arctan\frac{y}{l-x} \tag{4}$$

Figure 3:
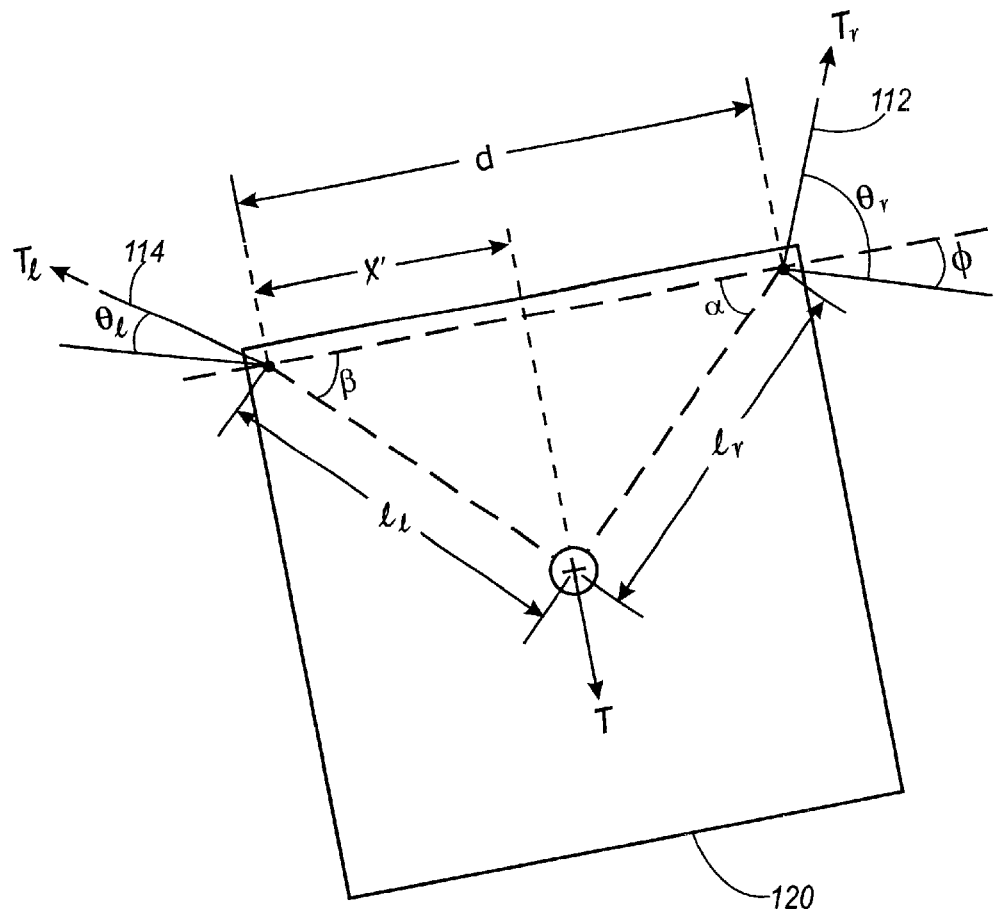
FIG. 3 is an elevation view diagram of an effector platform according to the present invention.

Fine tuning of the wire lengths $w_l$ and $w_r$ of left wire 114 and right wire 112, respectively, is then required for open-loop positioning of the pen or other effector at the target (x, y) location. This depends on the rotation angle $\phi$ that the platform takes, as shown in FIG. 3, due to the tension or force vector $T_l$ produced by the left suspension wire 114, and the tension or force vector $T_r$ produced by the right suspension wire 112.

The tensions $T_l$ and $T_r$ in the suspension wires may be determined by balancing the force components as shown:

$$T_g = mg = T_r \sin\theta_r + T_l \sin\theta_l \quad \text{(Vertical component)}$$

$$T_r \cos\theta_r = T_l \cos\theta_l \quad \text{(Lateral component)}$$

$$T_r = T_l \frac{\cos\theta_l}{\cos\theta_r}$$

$$T_l = T_r \frac{\cos\theta_r}{\cos\theta_l}$$

$$T_r \sin\theta_r + T_r \frac{\cos\theta_r \sin\theta_l}{\cos\theta_l} = mg$$

$$T_l \sin\theta_l + T_l \frac{\cos\theta_l}{\cos\theta_r} \sin\theta_r = mg$$

giving the suspension wire tensions $T_l$ and $T_r$ as:

$$T_l = \frac{mg}{\sin\theta_l + \cos\theta_l \tan\theta_r} \tag{5}$$

-continued $$T_r = \frac{mg}{\sin\theta_r + \cos\theta_r \tan\theta_l} \quad (6)$$

where m is the mass of the effector platform and g is the acceleration due to gravity.

At equilibrium the torques about the center of gravity of the effector platform due to the suspension wires balance out, so the angle φ of rotation at which the effector platform is at equilibrium may be found by:

$$\phi = \arctan\frac{T_r l_r \cos\alpha(\sin\theta_r - \cos\theta_r) - T_l l_l \cos\beta(\sin\theta_l + \cos\theta_l)}{T_l l_l \sin\beta(\sin\theta_l - \cos\theta_l) + T_r l_r \sin\alpha(\sin\theta_r + \cos\theta_r)} \quad (7)$$

where α and β are the upper right and upper left interior angles of the triangle formed by the support locations and the center of gravity of the effector platform, and $l_l$ and $l_r$ are the lengths of the sides of this triangle, as shown in FIG. 3.

Referring to FIG. 3, the angles taken by the suspension wires and platform determine the projected wire intersection point $p_1$ or (x', y') in the local coordinate system of the platform, are described as:

$$\frac{y'}{x'} = \tan(\theta_l + \phi)$$

$$\frac{y'}{d - x'} = \tan(\theta_r - \phi)$$

$$x'\tan(\theta_l + \phi) = (d - x')\tan(\theta_r - \phi)$$

giving $$x' = \frac{d\tan(\theta_r - \phi)}{\tan(\theta_l + \phi) + \tan(\theta_r - \phi)} \quad (8)$$

$$y' = \frac{d\tan(\theta_r - \phi)\tan(\theta_l + \phi)}{\tan(\theta_l + \phi) + \tan(\theta_r - \phi)} \quad (9)$$

where d is the distance between the suspension wire attachment points on the platform.

To determine the final tuning of suspension wire lengths required to position the pen or other effector located at $e'_x, e'_y$ in the platform coordinate system, use equations (1) and (2), but with augmented target positions (x+δx, y+δy), where the adjustment factors are given by $$\delta x = \delta x' \cos\phi + \delta y' \sin\phi \quad (10)$$

$$\delta y = -\delta x' \sin\phi + \delta y' \cos\phi \quad (11)$$

giving $$\delta x' = x' - e'_x \quad (12)$$

$$\delta y' = y' - e'_y \quad (13)$$

Since the winding of the wire onto the spool makes it difficult to measure length exactly due to overlapping windings and such other problems, it is estimated that the effector platform 120 may be positioned precisely to within 6 mm, which will likely be sufficient for most applications. However, if greater positioning precision is desired, alternative wire measurement mechanisms may be employed, and/or feedback information may be used for closed-loop positioning, which will be described in greater detail below.

Returning to FIG. 1, a left wire motion sensor 107 is mounted between the whiteboard 105 and the left spool 108, and a right wire motion sensor 109 is mounted between the whiteboard 105 and the right spool 110.

Closed-loop Positioning

As noted above, the open-loop effector platform positioning described above may be augmented by feedback from external sensor information in order to achieve fine scale positioning, or when the effector platform needs to be positioned with respect to objects or markings on the surface whose exact coordinates are not known. In these cases, the motors turning the wire spools are controlled through a feedback loop.

One example of this is the use of visual feedback from a computer vision system. It is well-known in the art how to direct a calibrated camera 150 to point at a location on a surface to obtain a closeup view of, in this case, the effector platform 120. It is also well-known how to detect a special mark 160 designed for machine recognition (e.g., a circle with crosshairs inside), known as fiducial marks, corresponding to known locations on the effector platform and a target location on the surface. Any of the well-known computer vision object recognition techniques may be used to further determine the relative location of objects on the surface and the effector platform. Using the calibration geometry, it is simple to transform these image displacements into desired adjustments in the platform position, (Δx, Δy).

The relationship between instantaneous changes in effector platform (x, y) position and lengths of the suspension wires is given via the Jacobian, $$\begin{bmatrix} \partial w_l \\ \partial w_r \end{bmatrix} = \begin{bmatrix} x(x^2 + y^2)^{\frac{1}{2}} & -x[(l-x)x^2 + y^2]^{\frac{1}{2}} \\ y(x^2 + y^2)^{\frac{1}{2}} & y[(l-x)x^2 + y^2]^{\frac{1}{2}} \end{bmatrix} \begin{bmatrix} \partial x \\ \partial y \end{bmatrix} \quad (14)$$

which is used to fine-tune the position of the effector platform 120.

Power and Control

In many applications of the whiteboard printer, such as those in which the effector platform is more than an passive pen carrier, it is desirable to provide power and/or control signals to the effector platform. In such instances, the two suspension wires 114 and 112 can serve to provide both power and control signals to the effector platform 120. By using a slip-ring (not shown) or electrically conductive roller (not shown) at each spool, one of the suspension wires is made to supply power and the other as a ground. These voltages may be modulated such as with high-frequency signals carrying control information to the effector platform. The on-board electronics 140 of the effector platform demodulate the signal from the power voltage using simple electronics. The signal itself is used by the onboard electronic controller to activate motors, solenoids, lights, etc. as needed. In an alternative embodiment, power may be supplied to the effector platform through an on-board battery (not shown). Using a battery can be advantageous in not requiring power to be transmitted down the suspension wires, which will allow different materials to be used as the wire as well as reduce the signal noise on the those wires, assuming signals are also transmitted down the suspension wires.

Figure 4:
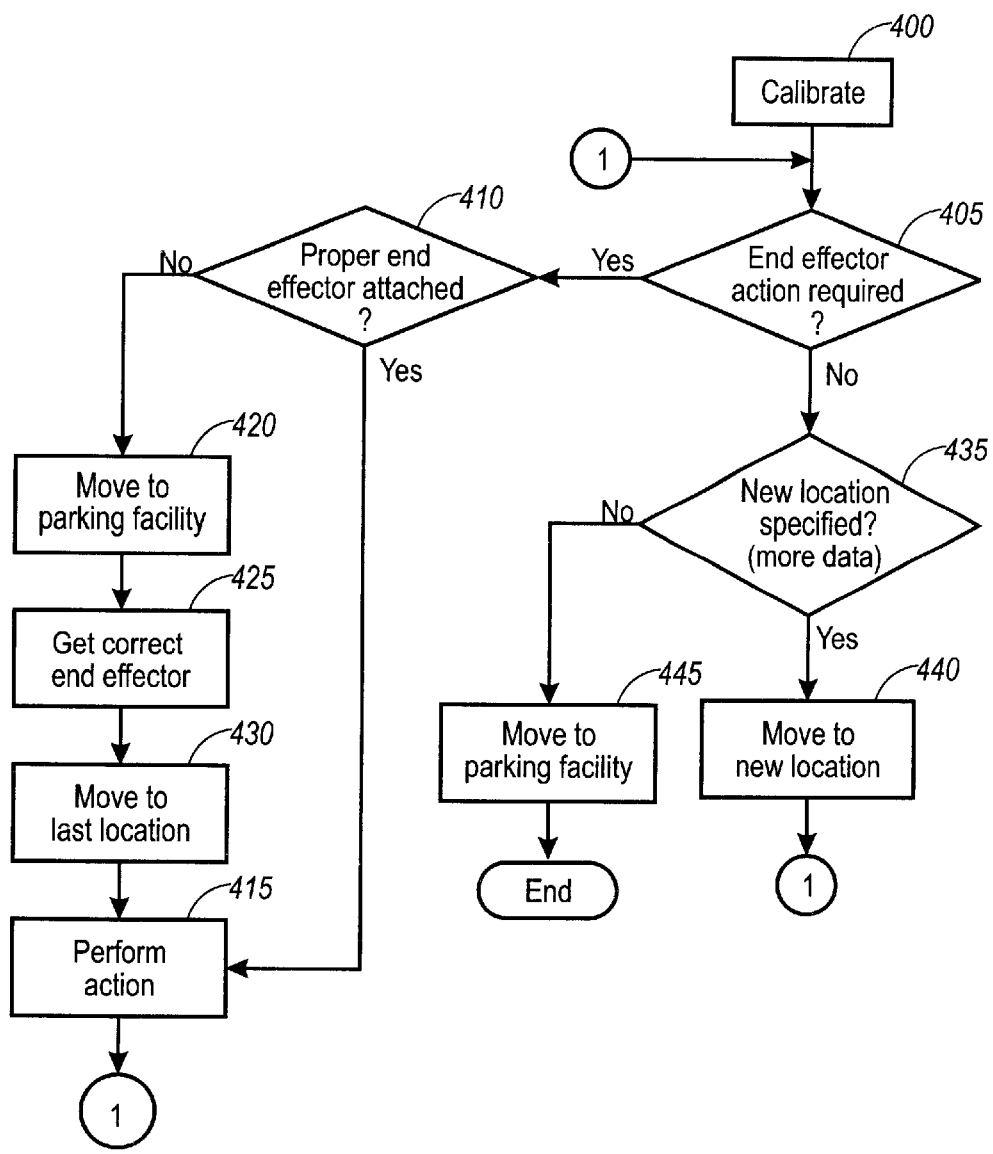
FIG. 4 is flowchart depicting an overall operation of the Pendulum Whiteboard Printer according to the present invention.

Referring to FIG. 4, the Pendulum Whiteboard Printer 100 may be used to move an effector platform 120 from one location to another and to perform an action using an end effector 130. If desired, the Pendulum Whiteboard Printer may be calibrated at any time, as shown in step 400, such as by positioning the effector platform at a known physical location and resetting the Pendulum Whiteboard Printer's coordinate space reference.

A determination is made, at step 405, as to whether an end effector action is required. If so, a further determination is made, at step 410 as to whether the correct end effector is in the effector platform. If so the end effector action is performed at the current location. See step 415. Those skilled in the art will recognize that the end effector action may be any number of different actions. For example, where the end effector is a marking pen, the action will be one of retracting the pen from the whiteboard surface so the effector platform can move to a next location without drawing a line and extending the pen to the whiteboard surface so the effector platform can draw a line while it moves to the next location. Robotic gripper, paint sprayer, and other end effectors may have additional or completely different actions as appropriate.

If, at step 410, the correct end effector was determined not to be in the effector platform, the effector platform is moved to the parking facility 170 where the end effectors are stored, at step 420 and the current end effector is exchanged for the desired end effector, at step 425. The effector platform is then moved back to its last position, at step 430, and the end effector action is performed, at step 415. After performing the end effector action, processing returns to step 405.

If, at step 405, no end effector action is required, a further determination is made, at step 435, as to whether a new location for the effector platform is specified, i.e., whether there is any more data. If a new location is specified, the effector platform is moved to the new location, at step 440, and processing returns to step 405. If, at step 435, there is no more data, the effector platform is moved to the parking facility, at step 445, and processing ends.

Figure 5:
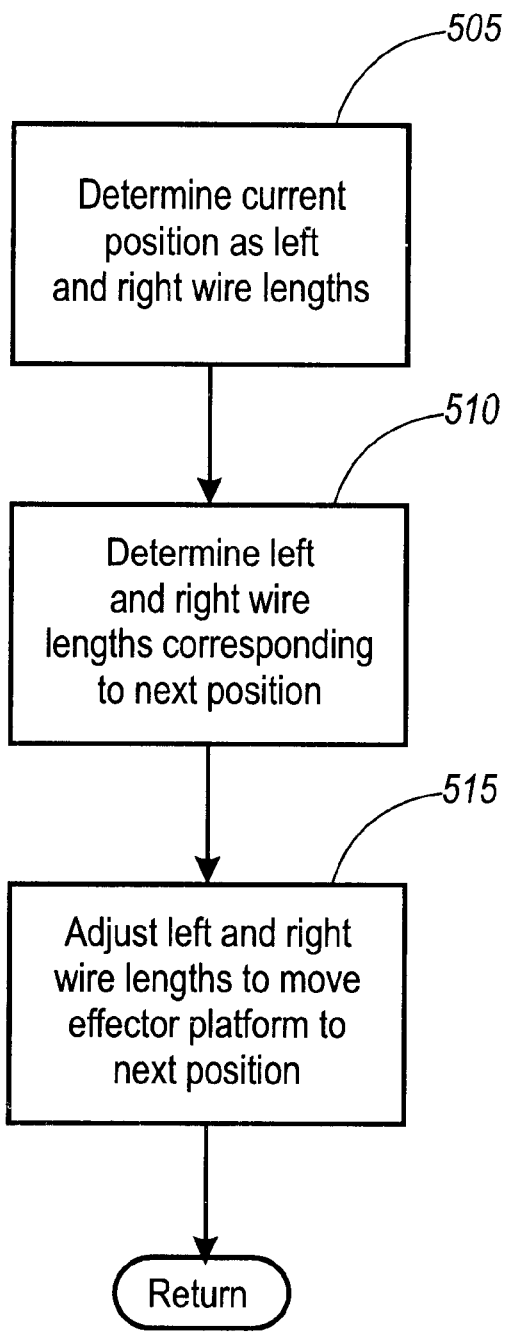
FIG. 5 is flowchart depicting an operation according to the present invention for moving an effector platform to generate an image.

Referring to FIG. 5, the moving of the effector platform is performed by determining the current position of the effector platform in terms of a left wire length $w_l$ and a right wire length $w_r$, at step 505. The left and right wire lengths corresponding to the next location for the effector platform are determined at step 510. The effector platform is move to the next location by adjusting the lengths of the left and right suspension wires 114 and 112 to the determined left and right wire lengths corresponding to the next location at step 515.

Those skilled in the art will recognize that not all steps are required for all effector platform configurations. For example, for an effector platform provided with multiple marking pens, such as for different colors, and being equipped with an eraser, then steps 420 through 430 may be implemented simply by retracting the current end effector and extending the desired end effector. As used in the present specification, retracting refers to moving an end effector away from the whiteboard surface, while extending refers to moving the end effector toward the whiteboard surface.

Applications

We propose the following as representative applications of the Pendulum Whiteboard Printer. Although the name of this device reflects its primary purpose, it should be recognized that the invention is of broad scope.

In an IN/OUT board application, the Pendulum Whiteboard Printer is used to place a mark next to entries that are known to be out of date or incorrect. An exemplary IN/OUT board application is discussed in greater detail in two co-assigned patent applications to Moran et al., U.S. Ser. No. 09/156,033 and U.S. Ser. No. 09/156,031, which were filed on Sep. 17, 1998, hereby incorporated by reference into the present application.

The Pendulum Whiteboard Printer can be used to print musical staff lines or rule lines onto a whiteboard in an instructional, expository, or exploratory setting.

In conjunction with a scanner and vectorization technology for converting bitmaps into strokes, the Pendulum Whiteboard Printer can be used copy hand-drawn material or printed line-art such as maps and engineering diagrams from a paper or electronic source onto a whiteboard.

In conjunction with a whiteboard scanning device and vectorization technology, The Pendulum Whiteboard Printer can be used copy material from one part of a whiteboard to another.

In settings where a very large whiteboard is used as a reference board the Pendulum Whiteboard Printer enables numbers and text to be written at locations that are difficult for human users to reach. Such settings include open marketplaces, schedule rooms, and operations planning centers.

A scaled-up version of the Pendulum Whiteboard Printer is useful as a robotic device for washing windows on large buildings. The effectors in this application may be a hose for delivering water or other cleaner and a squeegee, or may be any other combination of a cleaner delivery system and a cleaning element. A scaled-up version of the Pendulum Whiteboard Printer is applicable to painting sides of building, billboards, and other large surfaces.

Those skilled in the art will readily appreciate that various other uses of the pendulum Whiteboard Printer may be practiced according to the teachings set forth above without departing from the spirit and scope of the present invention.

What is claimed is:

1. In a whiteboard printer suitable for creating an image on a substantially vertical display surface, the whiteboard printer comprising an end effector adapted to perform an action, an effector platform that receives and carries the end effector, means for moving said effector platform consisting of a first effector platform positioner that moves the effector platform in a first variable direction in a vertical plane, and a second effector platform positioner that moves the effector platform in a second variable direction in the vertical plane, and a coordinator that controls the first and second effector platform positioning to move the effector platform in a desired direction in the vertical plane, a method for operating the whiteboard printer comprising: determining if an end effector action is required;

if an end effector action is required, performing the end effector action at a current position in the vertical plane of the effector platform;

if an end effector action is not required, determining if a new position in the vertical plane is specified for the effector platform; and if a new position is specified for the effector platform, moving the effector platform to the new position in the vertical plane by performing the steps consisting of:

determining a current first length from a distance from a current position for the effector platform to the first effector platform positioner;

determining a current second length from a distance from a current position for the effector platform to the second effector platform positioner;

determining next first and second lengths corresponding to distances from the first and second effector platform positioners, respectively, to a next position for the effector platform; and adjusting the current first and second lengths to the next first and second lengths to thereby move the effector platform from the current position to the next position.

2. The method of claim 1, wherein performing the end effector action at a current position in the vertical plane of the effector platform comprises:

determining whether a proper end effector for performing the action is in the effector platform;

moving the effector platform to a parking facility where the proper end effector is kept;

providing the effector platform with the proper end effector;

moving the effector platform back to the current position; and performing the action with the proper end effector.

3. The method of claim 1, further comprising moving the effector platform to a parking facility if no new position is specified for the effector platform.

4. In a whiteboard printer suitable for creating an image on a substantially vertical display surface, the whiteboard printer comprising an end effector adapted to perform an action, an effector platform that receives and carries the end effector, means for moving said effector platform consisting of a first effector platform positioner that moves the effector platform in a first variable direction in a vertical plane and a second effector platform positioner that moves the effector platform in a second variable direction in the vertical plane, and a coordinator that controls the first and second effector platform positioning to move the effector platform in a desired direction in the vertical plane, a method for operating the whiteboard printer comprising:

calibrating the whiteboard printer by:
moving the effector platform to a known physical location defined by known first and second lengths reflecting distances from the effector platform to the first and second effector platform positioners, respectively; and updating the current first and second lengths to the known first and second lengths, respectively;

determining if an end effector action is required;

if an end effector action is required, performing the end effector action at a current position in the vertical plane of the effector platform;

if an end effector action is not required, determining if a new position in the vertical plane is specified for the effector platform; and if a new position is specified for the effector platform, moving the effector platform to the new position in the vertical plane by performing the steps consisting of:

determining a current first length from a distance from a current position for the effector platform to the first effector platform positioner;

determining a current second length from a distance from a current position for the effector platform to the second effector platform positioner;

determining next first and second lengths corresponding to distances from the first and second effector platform positioners, respectively, to a next position for the effector platform; and adjusting the current first and second lengths to the next first and second lengths to thereby move the effector platform from the current position to the next position.

5. In a whiteboard printer suitable for creating an image on a substantially vertical display surface, the whiteboard printer comprising an end effector adapted to perform an action, an effector platform that receives and carries the end effector, means for moving said effector platform consisting of a first effector platform positioner that moves the effector platform in a first variable direction in a vertical plane and a second effector platform positioner that moves the effector platform in a second variable direction in the vertical plane, and a coordinator that controls the first and second effector platform positioning to move the effector platform in a desired direction in the vertical plane, a method for operating the whiteboard printer comprising:

calibrating said whiteboard printer by:
moving the effector platform to a known physical location defined by known first and second lengths reflecting distances from the effector platform to the first and second effector platform positioners, respectively; and updating the current first and second lengths to the known first and second lengths, respectively;

moving the effector platform to a position in the vertical plane by performing the steps consisting of:

determining a current first length from a distance from a current position for the effector platform to the first effector platform positioner;

determining a current second length from a distance from a current position for the effector platform to the second effector platform positioner;

determining next first and second lengths corresponding to distances from the first and second effector platform positioners, respectively, to a next position for the effector platform; and adjusting the current first and second lengths to the next first and second lengths to thereby move the effector platform from the current position to the next position.

* * * * *